US008806218B2

(12) United States Patent
Hatakeda (10) Patent No.: US 8,806,218 B2
(45) Date of Patent: Aug. 12, 2014

(54) MANAGEMENT AND SECURITY OF PERSONAL INFORMATION

(75) Inventor: Darrin Nobuharu Hatakeda, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 2230 days.

(21) Appl. No.: 11/083,526

(22) Filed: Mar. 18, 2005

(65) Prior Publication Data

US 2006/0212713 A1     Sep. 21, 2006

(51) Int. Cl.
G06F 21/00     (2013.01)

(52) U.S. Cl.
USPC ............................................ 713/182; 713/186

(58) Field of Classification Search
USPC ................................................... 713/182–185
See application file for complete search history.

(56) References Cited

U.S. PATENT DOCUMENTS

| | | | | |
|---|---|---|---|---|
| 5,991,878 | A | 11/1999 | McDonough et al. | 726/9 |
| 6,275,824 | B1 | 8/2001 | O'Flaherty et al. | 707/9 |
| 6,457,002 | B1 | 9/2002 | Beattie et al. | 707/3 |
| 6,490,601 | B1 | 12/2002 | Markus et al. | 715/507 |
| 6,629,843 | B1 | 10/2003 | Bunting et al. | 434/118 |
| 6,968,457 | B2 * | 11/2005 | Tam | 713/186 |
| 6,970,836 | B1 * | 11/2005 | Paltenghe et al. | 705/18 |
| 7,069,427 | B2 | 6/2006 | Adler et al. | 713/1 |
| 7,181,017 | B1 | 2/2007 | Nagel et al. | 380/282 |
| 7,289,971 | B1 * | 10/2007 | O'Neil et al. | 705/44 |
| 7,386,550 | B2 | 6/2008 | Brun | 707/9 |
| 7,424,543 | B2 | 9/2008 | Rice, III | 709/229 |
| 7,712,029 | B2 | 5/2010 | Ferreira et al. | |
| 7,853,481 | B1 * | 12/2010 | Johnson | 705/26.8 |
| 2001/0056463 | A1 | 12/2001 | Grady et al. | 709/203 |
| 2002/0087553 | A1 * | 7/2002 | Kitahara et al. | 707/10 |
| 2002/0091741 | A1 | 7/2002 | Ferreira et al. | 715/530 |
| 2002/0112167 | A1 | 8/2002 | Boneh et al. | 713/182 |
| 2003/0004734 | A1 | 1/2003 | Adler et al. | 705/1 |

(Continued)

OTHER PUBLICATIONS

U.S. Final Office Action dated Jan. 13, 2009 cited in U.S. Appl. No. 11/021,725.

(Continued)

Primary Examiner — Farid Homayounmehr
Assistant Examiner — Suman Debnath
(74) Attorney, Agent, or Firm — Steve Crocker; Jim Ross; Micky Minhas (57) ABSTRACT

Methods, systems, and computer readable media are provided for managing and securing personal information. Personal information is stored in a central repository (personal information store) for a given personal information owner. As personal information is changed, the owner of the personal information may access the personal information store to update information stored therein. Access codes may be established for all personal information, and the use of the codes may be restricted by application of one or more rules or permissions applied to the information requesters. Alternatively, special access codes may be established for one or more pieces or combination of pieces of personal information data contained in the personal information store. Upon request or requirement for personal information, information requesters may be provided one or more access codes to allow the information requester to receive only that personal information for which they are authorized. Encrypted keys may be provided from the personal information store to information requesters instead of financial information or address information for a given personal information owner. Use of the encrypted address keys allows an information requester process a transaction or to contact a personal information owner without receiving actual financial information or contact information for the personal information owner.

19 Claims, 3 Drawing Sheets (56) References Cited

U.S. PATENT DOCUMENTS

| | | | |
|---|---|---|---|
| 2003/0014418 A1 | 1/2003 | Adler et al. | 707/100 |
| 2003/0014654 A1 | 1/2003 | Adler et al. | 713/200 |
| 2003/0036958 A1* | 2/2003 | Warmus et al. | 705/14 |
| 2003/0051054 A1 | 3/2003 | Redlich et al. | 709/246 |
| 2003/0097594 A1 | 5/2003 | Penders | 713/201 |
| 2003/0120784 A1* | 6/2003 | Johnson et al. | 709/228 |
| 2003/0130893 A1 | 7/2003 | Farmer | 705/14 |
| 2004/0049294 A1 | 3/2004 | Keene et al. | 700/5 |
| 2004/0078596 A1 | 4/2004 | Kent et al. | 713/201 |
| 2004/0199782 A1 | 10/2004 | Arnold | 713/200 |
| 2004/0205567 A1 | 10/2004 | Nielsen | 715/513 |
| 2005/0027618 A1 | 2/2005 | Zucker et al. | 705/26 |
| 2005/0050028 A1 | 3/2005 | Rose et al. | 707/3 |
| 2005/0097455 A1 | 5/2005 | Zhou et al. | 715/513 |
| 2005/0138110 A1 | 6/2005 | Redlich et al. | 709/201 |
| 2005/0177559 A1* | 8/2005 | Nemoto | 707/3 |
| 2006/0019634 A1* | 1/2006 | Hawkes | 455/411 |
| 2006/0095956 A1 | 5/2006 | Ashley et al. | 726/4 |
| 2006/0136985 A1 | 6/2006 | Ashley et al. | 726/1 |
| 2006/0143459 A1 | 6/2006 | Villaron et al. | 713/176 |
| 2007/0038437 A1 | 2/2007 | Brun | 704/9 |
| 2007/0271463 A1 | 11/2007 | Ginter et al. | 713/176 |
| 2008/0049971 A1* | 2/2008 | Ramos et al. | 382/100 |
| 2008/0086523 A1 | 4/2008 | Afergan et al. | 709/202 |
| 2008/0092058 A1 | 4/2008 | Afergan et al. | 715/745 |
| 2008/0147554 A1 | 6/2008 | Stevens et al. | 705/51 |

OTHER PUBLICATIONS

U.S. Office Action dated Jan. 15, 2009 cited in U.S. Appl. No. 09/755,418.

U.S. Office Action dated Jan. 25, 2008 cited in U.S. Appl. No. 09/755,418.

U.S. Final Office Action dated Jul. 11, 2008 cited in U.S. Appl. No. 09/755,418.

U.S. Office Action dated Jun. 13, 2008 cited in U.S. Appl. No. 11/021,725.

U.S. Appl. No. 09/755,418, filed Jan. 5, 2001 entitled "Method of Removing Personal Information From an Electronic Document".

U.S. Appl. No. 11/021,725, filed Dec. 23, 2004 entitled "Method and System for Managing Personally Identifiable Information and Sensitive Information in an Application-Independent Manner".

U.S. Office Action dated May 7, 2004 cited in U.S. Appl. No. 09/755,418.

U.S. Office Action dated Nov. 3, 2004 cited in U.S. Appl. No. 09/755,418.

U.S. Office Action dated Apr. 28, 2005 cited in U.S. Appl. No. 09/755,418.

U.S. Office Action dated Oct. 18, 2005 cited in U.S. Appl. No. 09/755,418.

U.S. Office Action dated Mar. 27, 2006 cited in U.S. Appl. No. 09/755,418.

U.S. Office Action dated Sep. 19, 2006 cited in U.S. Appl. No. 09/755,418.

U.S. Office Action dated Jun. 20, 2007 cited in U.S. Appl. No. 09/755,418.

Habraken, J., StarOffice 5.2 Calc Handbook, Prentice Hall, Dec. 2000, Chapter 2.

Memorandum and four figures regarding StarOffice 5.1; date is unknown, but believed to be earlier than Jan. 5, 2001.

Plaxo Products, Sep. 17, 2004, http://web.archive.org/web/20040917032222/plaxo.com/products.

Plaxo Your Privacy Choices, Sep. 23, 2004, http://web.archive.org/web/20040923061703/plaxo.com/privacy/q_and_a.

Plaxo Your Privacy Choices, Sep. 29, 2004, http://web.archive.org/web/20040929130829/plaxo.com/privacy/privacy_choices.

Plaxo's Personal Card: Revised Plaxo Privacy Policy—2.0, Oct. 9, 2004, http://web.archive.org/web/20041009201934/blog.plaxo.com/archives/000022.html.

U.S. Office Action dated Jul. 14, 2009 cited in U.S. Appl. No. 11/021,725.

* cited by examiner

MANAGEMENT AND SECURITY OF PERSONAL INFORMATION

FIELD OF THE INVENTION

The present invention generally relates to management and security of personal information. More particularly, the present invention relates to management and security of personal information transferred across distributed computing environments.

BACKGROUND OF THE INVENTION

With the advent of distributed computing environments, such as the Internet, users are often asked to provide various types and amounts of personal information to other users, businesses, government agencies, educational institutions, and the like. For example, if a user desires to reserve a restaurant table via a restaurant web page, the user may be asked for her name, telephone number, and possibly a credit card number. At the other end of the information spectrum, if a user requests a personal credit report from a credit reporting agency, the user may be asked for her name, address, previous address, social security number, place of employment, credit card and loan numbers, etc. In addition to the foregoing, users often inadvertently disclose certain types of information, including personally-identifiable information, such as metadata associated with a document the user prepares/edits and distributes.

A number of problems are associated with the foregoing information exchanges. First, personal information owners/users do not have a single location to store and update personal information. That is, users must supply personal information to each information requester on an individual basis. As personal information for a given user changes, the user must contact all parties with out-of-date information to update those parties, or the user must supply updated information on a case-by-case basis as the user needs goods, services, or other from an interested party. Secondly, the user has no way of efficiently tracking which parties should get updated personal information. Additionally, because personal information raises many security concerns, the user has no efficient method of controlling future or subsequent use of the personal information, or of detecting unauthorized leaks of personal information.

Accordingly, there is a need for methods and systems for managing and securing personal information. It is with respect to these and other considerations that the present invention has been made.

SUMMARY OF THE INVENTION

Embodiments of the present invention solve the above and other problems by providing a personal information store at which a user may store a variety of personal information data and from which authorized requesters may retrieve personal information. According to one embodiment, a user stores a variety of personal information in a central repository (personal information store), such as name, address, telephone number, cell phone number, fax number, e-mail address, social security number, office number and address, credit card numbers, and the like. If at any time any of the stored personal information changes, the user may access the personal information store and update the information.

According to one embodiment of the present invention, a single access code is provided to all information requesters, but each information requester is given permission based on a rule associated with each information requester that allows each individual information requester to obtain only authorized information via the single access code. For example, a first information requester may have permission for only receiving a name and telephone number for a given personal information owner. A second information requester may have permission to retrieve the name, address, telephone number and a credit card number for the personal information owner.

According to another embodiment, a special access code is assigned to each piece of personal information and to combinations of the personal information. For example, a first code may be assigned to the user's name, a second code may be assigned to the user's address, a third code may be assigned to a combination of the user's name, address, and credit card number, and so on. Subsequently, when the user receives a request from an information requester, for example from a web page of a business or government agency, the user may provide the access code that will authorize retrieval of only the requested information. The requester may then use the code to access the personal information store to retrieve the requested information. In either case, because the owner of the personal information may access the personal information store to keep the personal information updated, there is no need to contact various information requesters with information updates because when the access codes are used, the most up-to-date personal information will be retrieved.

According to another embodiment, the permissions applied to the access code, or any one of the special access codes associated with various personal information data may be populated with expiration dates so that a given requester may only use a given access code for a prescribed length of time. Additionally, the codes may provide a "per use" restriction (e.g., one use, two uses, etc.) of information retrieved from the personal information store. According to another embodiment, information provided from the personal information store may have embedded leak markers, for example, a traceable electronic key, or a small bit of innocuous information that is not obvious to a requester, but that will allow the owner of the personal information to track the personal information if it is passed to an unauthorized party.

According to another embodiment, instead of allowing information requesters to access certain personal information, such as credit card and other financial information, or contact information, such as e-mail addresses, telephone numbers, home addresses, and the like, an encrypted key or code may be provided to information requesters for allowing the requesters to process transactions or contact the owner of the personal information via the personal information store or via a contact transfer site. For example, an encrypted key for a credit card number may be translated at the personal information store or at a contact transfer site into the actual credit card number so that credit information is provided to a requester without providing the requester the actual credit card number of the personal information owner. For another example, the encrypted key for a requested e-mail address may redirect the information requester to a transfer site operated by the personal information store rather than to the actual owner of the personal information. The transfer site may then forward the e-mail or other form of communication to the owner of the personal information so that the information requester never receives the actual contact information (e.g., e-mail address) for the owner of the personal information.

These and other features and advantages, which characterize the present invention will be apparent from a reading of the following detailed description and a review of the associated drawings. It is to be understood that both the foregoing general description and the following detailed description are exemplary and explanatory only and are not restrictive of the invention as claimed.

DETAILED DESCRIPTION

As briefly described above, embodiments of the present invention are directed to methods, systems, and computer readable media for managing and securing personal information transferred across distributed computing environments, such as the Internet and intranets. Personal information is stored in a central repository (personal information store) for a given personal information owner. As personal information is changed, the owner of the personal information may access the personal information store to update information stored therein. Access codes may be established for all personal information, and the use of the codes may be restricted by application of one or more rules or permissions applied to the information requesters. Alternatively, access codes may be established for one or more pieces or combination of pieces of personal information data contained in the personal information store. Upon request or requirement for personal information, information requesters may be provided one or more access codes to allow the information requester to receive only that personal information for which they are authorized. Encrypted keys may be provided from the personal information store to information requesters instead of financial information or address information for a given personal information owner. Use of the encrypted address keys allows an information requester to process a financial transaction, or to contact a personal information owner without receiving actual financial account numbers or contact information for the PI owner.

These embodiments may be combined, other embodiments may be utilized, and structural changes may be made without departing from the spirit or scope of the present invention. The following detailed description is therefore not to be taken in a limiting sense and the scope of the present invention is defined by the appended claims and their equivalents.

Figure 1:
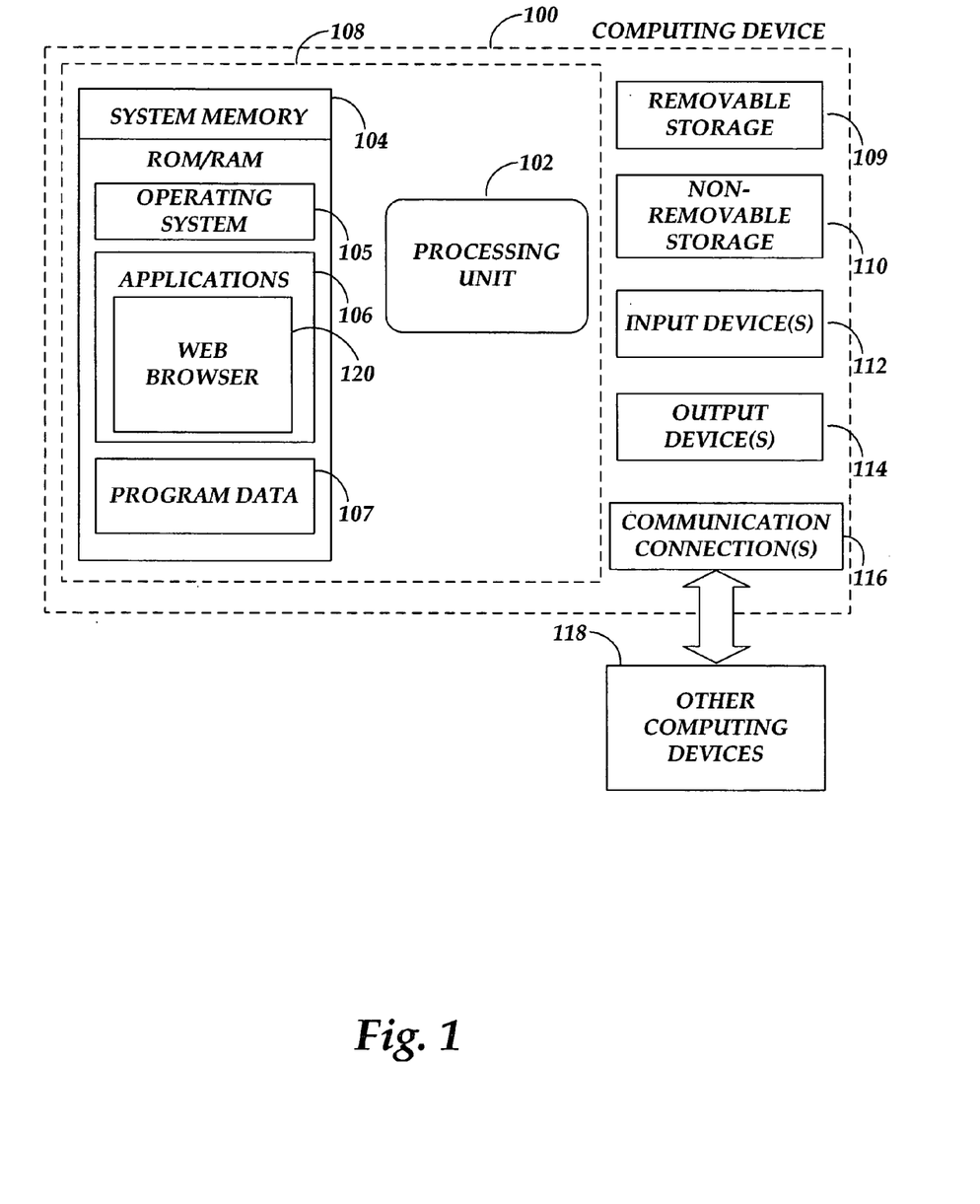
FIG. 1 is a block diagram showing the architecture of a personal computer that provides an illustrative operating environment for embodiments of the present invention.

Referring now to the drawings, in which like numerals refer to like elements through the several figures, aspects of the present invention and an exemplary operating environment will be described. FIG. 1 and the following discussion are intended to provide a brief, general description of a suitable computing environment in which the invention may be implemented. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Embodiments of the invention may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

With reference to FIG. 1, one exemplary system for implementing the invention includes a computing device, such as computing device 100. In a basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. In one embodiment, application 106 may include a web browsing application 120, such as INTERNET EXPLORER®, manufactured by MICROSOFT CORPORATION. This basic configuration is illustrated in FIG. 1 by those components within dashed line 108.

The computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well know in the art and need not be discussed at length here.

Computing device 100 may also contain communication connections 116 that allow the device to communicate with other computing devices 118, such as over a network in a distributed computing environment, for example, an intranet or the Internet. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

A number of program modules and data files may be stored in the system memory 104 of the computing device 100, including an operating system 105 suitable for controlling the operation of a networked personal computer, such as the WINDOWS operating systems from MICROSOFT CORPORATION of Redmond, Wash. System memory 104 may also store one or more program modules, such as word processor application 120, and others described below. The web browsing application 120 is operative to provide functionality for viewing, editing, and processing electronic information via one or more Internet-based or other network-based web pages. In addition, as described herein, web page content is edited in a web page editing mode. Web page editing may be performed via an editing mode of the web browsing application 120, or via another suitable web page editing application or tool may be programmed for allowing editing of a web page via a drag and drop operation described herein. Other applications 106 that may be used in accordance with embodiments of the present invention include electronic mail and contacts applications, word processing applications, spreadsheet applications, database applications, slide presentation applications, drawing or computer-aided application programs, etc.

Figure 2:
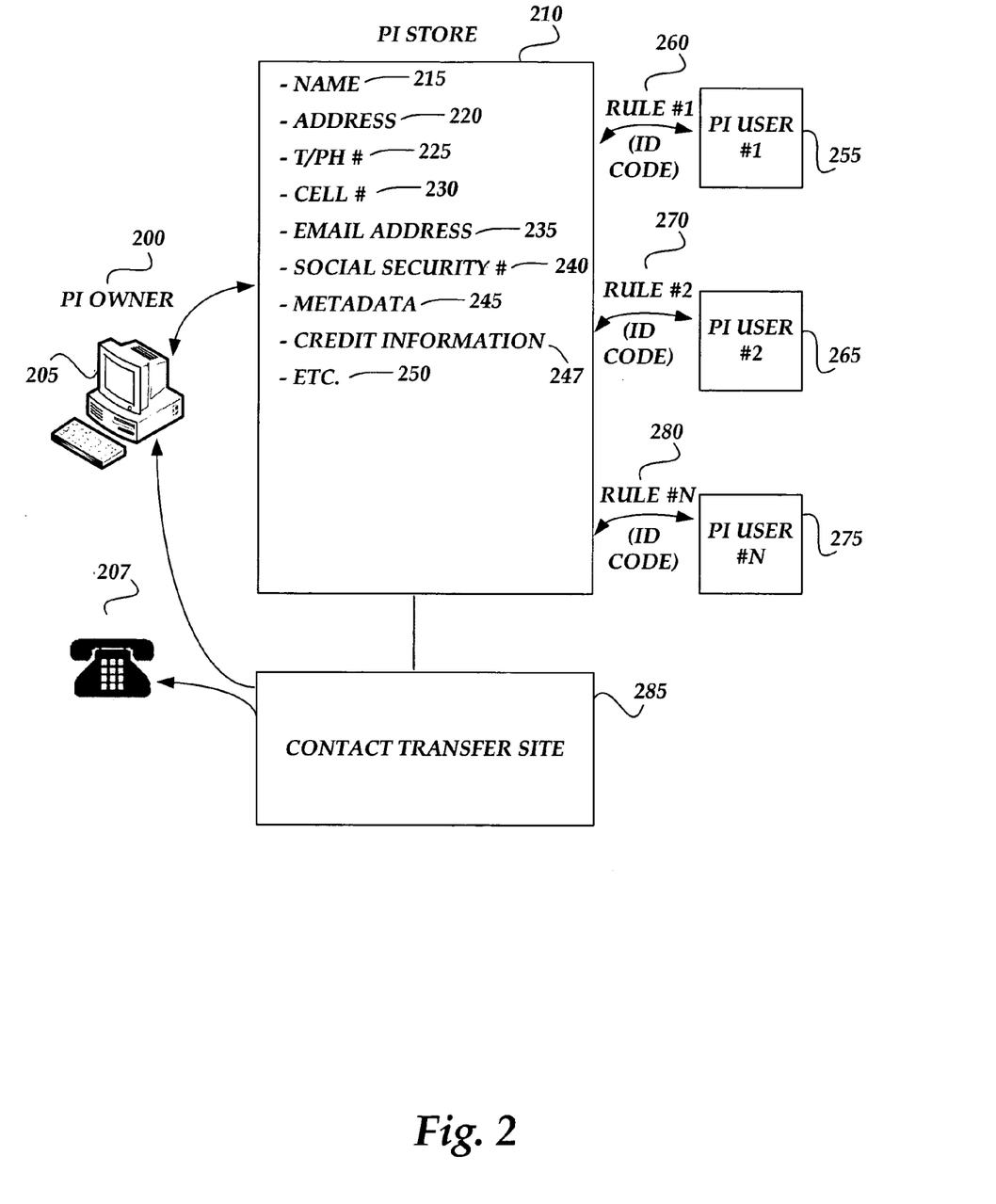
FIG. 2 is a simplified block diagram showing an architectural relationship between a personal information owner, a personal information store, and requesters of personal information according to embodiments of the present invention.

FIG. 2 is a simplified block diagram showing an architectural relationship between a personal information owner, a personal information store, and requesters of personal information according to embodiments of the present invention. Referring now to FIG. 2, the personal information store (PI store) 210 is a data repository that may be in the form of any suitable database or shared data server system for storing information that may be updated and accessed according to embodiments of the present invention. According to embodiments of the present invention, the personal information store 210 may be used for storing a variety of personal information (PI) from a given personal information owner (PI owner) 200. For example, personal information stored in the PI store 210 may include the owner's name 215, address 220, telephone number 225, cell telephone number 230, e-mail address 235, social security number 240, metadata 245, or any other personal information that the owner 200 may need to make available to outside parties from time to time. For example, the metadata 245 is illustrative of information associated with documents or other objects created or edited by the personal information owner 200 that may contain personally-identifiable information about the owner such as the owner's name, office address, dates of document creation or document edit and the like.

According to one embodiment, the personal information owner 200 may log onto a personal information store web page or other portal from her computer 205 for accessing the personal information store 210 for adding information or updating information contained therein. For example, if the PI owner's address changes, the PI owner may log onto the PI store 210 and change her address in the PI store 210. Accordingly, as information associated with the PI owner 200 is changed from time to time, the PI owner 200 is not required to contact individual users of the information to make sure that each user has the updated information.

According to another embodiment of the present invention, leak markers may be embedded in information contained in the PI store 210 which may be used for tracking the information as it is used by various information requesters. For example, a leak marker may be any type of innocuous information that will be known only to the PI owner and that may be used to track the information if it is passed to unauthorized users. For example, a character or punctuation mark or other innocuous data that may be added to one or more pieces of personal information in the PI store 210 may be used by the PI owner 200 for tracking unauthorized transmission or use of the marked personal information. Leak markers may also be in the form of a traceable electronic key or code that does not appear as surface-level data, but as traceable metadata that is associated with various personal information that will allow the personal information to be tracked and identified by the PI owner 200.

Once the personal information is stored in the PI store 210, as described above, the information may be made available to a number of personal information requesters/users such as the PI users 255, 265, 275. For example, a first PI user 255 may be a social club to which the PI owner belongs which requires access to the PI owner's name, address, telephone number and cell telephone number. For another example, the PI user 265 may be a product sales organization that offers products via an Internet-based web page, and the product sales organization may require the name, address and credit card number for the PI owner. The PI user 275 may be a government agency or quasi-government agency requiring a user's name, address, social security number, and present and immediately past employer names. Accordingly, as can be seen, a vast number of personal information users may need access to one or more personal information data items or to one or more combinations of personal information data items. On the other hand, no two personal information users may need the same data items or combination of data items from the personal information owner 200.

According to embodiments of the present invention, rather than providing general access to the personal information store 210 by any of the personal information users 255, 265, 275, or rather than having the personal information owner provide information to each requesting user on an individual basis, requiring updates any time information is changed, an access code may be provided to each personal information user to provide each user with access to the PI store 210 of the associated PI owner 200. Each personal information user is then provided with customized permissions or rules 260, 270, 280 that allow each individual PI information requester to access and retrieve only those data items from the PI store 210 that each respective PI information requester is authorized. For example, if the first PI user 255 only needs the name, address and telephone number of the PI owner 200, then the access rules and permissions associated with the first information requester will allow that requester to only retrieve the name, address, and telephone number from the PI store 210. On the other hand, if the third PI requester 275 requires the name, address, telephone number, social security number, and names of present and past employers, the access rules and permissions associated with the third information requester will allow the third information requester to retrieve the additional required information.

In addition, rules and permissions may be placed on the access code that allow a given information requester to retrieve one or more pieces of personal information on a timed basis. For example, a given information requester may receive access to certain personal information for a period of one week, two days, one month, and the like. Alternatively, information requesters may be provided rules and permissions granting them access to personal information on "per use" basis, whereby a given information requester may be provided access to one or more data items for one use, two uses, three uses, and the like. Importantly, as described above, according to embodiments of the present invention, if any of the personal information is changed, the PI owner may update the information at the PI store 210, and the information requesters will receive up-to-date information which is as current as the PI owner's last update to the information contained in the PI store 210.

According to an alternative embodiment, instead of providing each information requester with a single access code for retrieving personal information from the PI store 210, a number of different special access codes may be generated for different pieces of personal information and for different combinations of pieces of personal information. For example, a first code may be associated with retrieving the name of the personal information owner, a second code may be associated with retrieval of the address of the personal information owner, a third code may be associated with retrieval of the telephone number. A next code may be associated with a combination of the name, address and telephone number of the personal information owner. A next code may be associated with the name, address, e-mail address, social security number of the personal information owner, and so on.

According to this embodiment, when an information requester requests personal information from the personal information owner, a personal information access code is provided to the information requester that is tailored to the particular information needed by the requester. For example, if a given information requester 255 operates a web site for selling books, and the personal information owner 200 purchases a book over the information requester's web site, if the information requester requires name, address and credit card number, the personal information owner 200 may supply the information requester with a special access code which will allow the information requester to retrieve the required information from the PI store 210. In addition, such special access codes may be programmed to provide the requested information on a per use basis or on a timed basis as described above.

Referring still to FIG. 2, according to another embodiment of the present invention, often information requesters 255, 265, 275, desire to contact the personal information owner 200 via electronic mail, telephone, or via mail delivered to a physical address. Additionally, as described above, information requesters often require financial information, such as credit card numbers, for processing a variety of transactions, for example, Internet-based purchases. For purposes of security and/or privacy, the personal information owner 200 may desire that her contact information and financial information not be provided to third party information requesters, but nonetheless, the personal information owner 200 may require that such third party information requesters be able to contact her and/or utilize her financial information. According to this embodiment of the present invention, if the information requester 255, 265, 275 requests contact information, for example, physical address, telephone number, cellular telephone number, e-mail address, and the like, or financial information, for example, credit card numbers, from the PI store 210, an encrypted key is passed to the information requester to allow the information requester to process financial information, or to contact the personal information owner via a transfer site, as described below.

According to one aspect of this embodiment, the encrypted key contains address information for allowing the information requester to contact the personal information owner via a contact transfer site 285 instead of direct contact with the personal information owner 200. The contact transfer site 285 may be a suitable e-mail server, telecommunications switch, or physical mail transfer facility operated with the PI store 210, or the contact transfer site may be operated separately from the PI store 210 via a distributed computing/telecommunications/mail network. For example, an electronic mail address provided to the information requester may be an electronic mail address for the contact transfer site 285 instead of the electronic mail address of the PI owner 200. Similarly, a telephone number requested by an information requester 255, 265, 275 may be passed in the form of a telephone number to the contact transfer site 285. When the information requester attempts contact with the personal information owner 200, the contact is intercepted at the contact transfer site 285 and is then forwarded to the personal information owner 200 at her computer 205, telephone 207, or physical mailing address. Thus, the PI owner 200 has received the required contact from the information requester 255, 265, 275 without releasing her actual contact information.

According to another aspect of this embodiment, the encrypted key may be translated into a credit card number or other financial information so that an information requester may process a transaction without receiving the actual credit card number or other identification for the PI owner's financial information. For example, when an information requester utilizes an access code for requesting financial information for the PI owner, the requester receives an encrypted key in place of financial information, such as credit card numbers. Alternatively, a PI owner may provide an information requester an encrypted key instead of an actual financial identification (e.g., credit card number) during a transaction, for example, an Internet-based purchase. When the information requester processes the transaction, the encrypted key may be used by the information requester instead of an actual financial identification. The encrypted key may be translated into the actual financial identification at the transfer site 285, the PI store 210, or at a financial institution where the account information associated with the encrypted key is maintained. For example, the encrypted key may be passed by the information requester to a credit card company which, in turn, translates the key and provides payment to the requester. Thus, the information requester receives payment and processes the desired transaction without ever receiving the PI owner's actual financial account identification.

Figure 3:
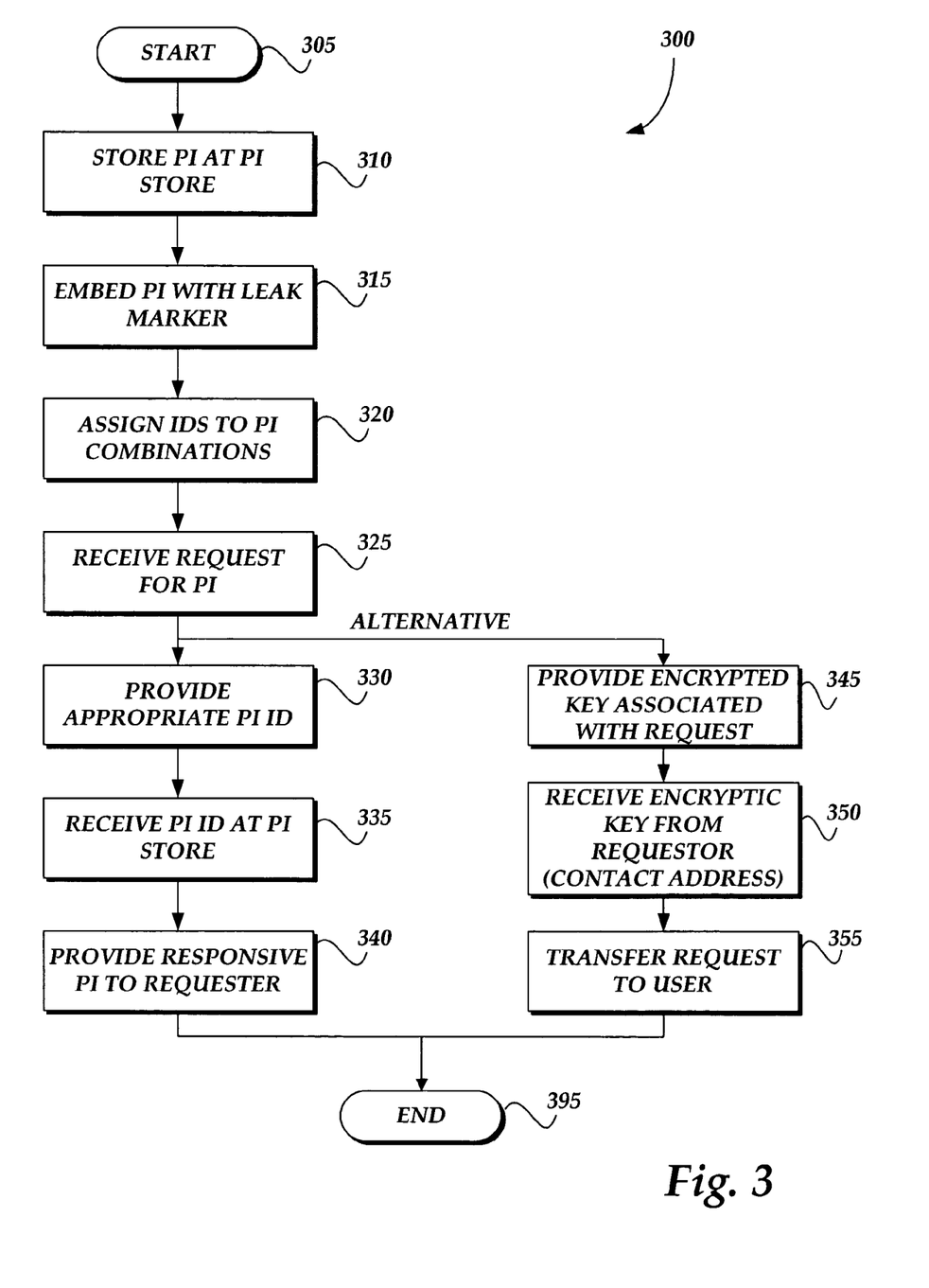
FIG. 3 is a flow diagram showing an illustrative routine for storing and providing personal information to information requesters according to embodiments of the present invention.

Having described an exemplary operating environment for embodiments of the present invention with respect to FIGS. 1 and 2 above, FIG. 3 is a flow diagram showing an illustrative routine for storing and providing personal information to information requesters according to embodiments of the present invention. Referring to FIG. 3, the routine 300 begins at start block 305 and proceeds to block 310 where a personal information owner such as a consumer, student, employee, or other user of personal information stores personal information at the personal information store 210. At block 315, if desired, the personal information is embedded with leak markers for tracking the personal information provided by the PI owner 200 in the event of unauthorized access to or provision of personal information. At block 320, a single access code is generated for the personal information, and permissions and rules are generated for allowing information requesters/users to access the personal information as authorized. Alternatively, special access codes are generated for each piece of personal information contained in the PI store 210 and for combinations thereof.

Next, in response to an interaction between the personal information owner and an information requester, for example, transmission of a purchase order via an Internet-based web page, an information request is received at the PI store 210 from an information requester 255, 265, 275. At block 330, the information requester provides an appropriate access code, as described above. At block 335, the PI store 210 receives the access code from the information requester and determines whether the access code is a valid code for the requested information. At block 340, if the access code received from the information requester is a valid code, the personal information requested by the information requester is provided from the PI store 210.

Referring back to block 325, if the request for personal information received from the information requester is in the form of a request for certain financial information (the PI owner desires to keep confidential) or contact information for contacting the personal information owner 200, the routine proceeds to block 345, and an encrypted key associated with the request is provided to the information requester. For example, as described above, if the information requester desires to contact the PI owner via electronic mail, the encrypted key passed to the information requester may be in the form of an electronic mail address which will allow the information requester to contact the PI owner via the contact transfer site 285. For another example, as described above, an encrypted key may be provided to the requester for allowing the requester to obtain payment for a transaction without receiving a PI owner's credit card number. At block 350, the contact from the information requester is received at the transfer site 285, and at block 355, the request or other contact is transferred to the PI owner 200, as described above. Or, at block 350, the information requester is able to process a financial transaction, such as a product or service sale, by passing the encrypted key in place of financial identification information. The routine ends at block 395.

As described herein, methods and systems provide for management and security of personal information. It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

I claim:

1. A method of managing personal information in a distributed computing environment, the method comprising:
    storing personal information at a personal information store, further comprising embedding a leak marker in the personal information for tracking subsequent transfer of the stored personal information, wherein the leak marker is associated with at least one portion of the personal information and identifiable to a personal information owner;
    generating, by a computer, an access code for providing access to the personal information, wherein generating the access code to the requester of personal information from the personal information store comprises generating an access code valid for an authorized period of time;
    providing the access code to a requester of personal information from the personal information store;
    receiving at the personal information store a request for a portion of the personal information along with a requester access code;
    when the requester access code matches the access code provided to the requester of the personal information, providing the requested portion of the personal information from the personal information store, wherein providing the requested portion of the personal information from the personal information store comprises providing the requested portion of the personal information to a transfer site, the transfer site being configured to provide the requester with a service corresponding to the requested personal information without revealing the personal information; and
    when the request for the portion of the personal information is a request for financial information for a provider of the personal information, providing an encrypted key for allowing the requester of personal information to process a transaction using the encrypted key without receiving the financial information for the provider of the personal information.

2. The method of claim 1, wherein generating the access code for providing access to the personal information includes generating a special access code for each portion of the personal information and for each combination of portions of the personal information.

3. The method of claim 2, wherein providing the access code to the requester of personal information from the personal information store includes providing the special access code associated with one of the following: one of the portions of personal information and a combination of portions of the personal information for providing the requester of personal information access to one of: an authorized portion and a combination of authorized portions of the personal information.

4. The method of claim 3, wherein receiving at the personal information store the request for the portion of the personal information along with the requester access code further comprises receiving at the personal information store the request for the portion of the personal information along with a requester special access code, and further comprising providing the requested portion of the personal information from the personal information store when the requester special access code matches the special access code provided for accessing the requested portion of the personal information.

5. The method of claim 1, further comprising generating at least one access rule associated with the access code for providing access to an authorized portion of the personal information.

6. The method of claim 5, wherein providing the access code to the requester of personal information from the personal information store further comprises applying the at least one access rule to the provided access code for restricting access by the requester of personal information to the authorized portion of the personal information.

7. The method of claim 6, further comprising applying the at least one access rule to the provided access code for restricting access by the requester of personal information to the authorized portion of the personal information for an authorized number of uses.

8. The method of claim 1, prior to providing the requested portion of the personal information from the personal information store, determining whether the access code received at the personal information store is valid for the requested portion of the personal information.

9. The method of claim 1, wherein storing personal information at the personal information store further comprises updating at least one portion of the personal information stored in the personal information store.

10. The method of claim 9, further comprising when a valid request is subsequently received for the at least one portion of the personal information that has been updated, providing the at least one updated portion of the personal information in response to the valid request.

11. The method of claim 1, further comprising when the request for the portion of the personal information is a request for contact information for a provider of the personal information, providing the contact information for routing a transmission from the requester of the contact information to the provider of the personal information via the contact transfer site such that the requester of the contact information is prevented from directly contacting the provider of the personal information.

12. The method of claim 1, wherein storing personal information at the personal information store, further comprising after providing the requested portion of the personal information from the personal information store, determining whether an unauthorized party has possession of the requested portion of the personal information by checking the portion of personal information in possession of the unauthorized party for the leak marker.

13. A method of managing personal information in a distributed computing environment, the method comprising:
generating, by a computer, an access code for providing access to stored personal, further comprising embedding a leak marker in the personal information for tracking subsequent transfer of the stored personal information, wherein the leak marker is associated with at least one portion of the personal information and identifiable to a personal information owner;
generating at least one access rule associated with the access code for providing access to at least one portion of the personal information;
applying the at least one access rule to the access code for restricting access to the at least one portion of the personal information, wherein applying the at least one access rule to the access code for restricting access to the at least one portion of personal information comprises restricting access to the at least one portion of personal information for an authorized period of time;
providing the access code to a requester of personal information;
receiving at the personal information store a request for the at least one portion of the personal information along with a requester access code;
when the requested portion of the personal information complies with the at least one applied access rule associated with the requester access code, providing, by a computing device, information corresponding to a transfer site, the transfer site being configured to provide the requester with a service associated with the requested at least one portion of the personal information without revealing the personal information to the requester; and
when the request for the portion of the personal information is a request for financial information for a provider of the personal information, providing an encrypted key for allowing the requester of personal information to process a transaction using the encrypted key without receiving the financial information for the provider of the personal information.

14. The method of claim 13, wherein applying the at least one to the access code for restricting access by the requester of personal information to the at least one portion of the personal information comprises restricting access to the at least one portion of the personal information for an authorized number of uses.

15. The method of claim 13, further comprising prior to providing the requested at least one portion of the personal information, determining whether the requester access code received at the personal information store is valid for the requested at least one portion of the personal information.

16. A computer-readable storage device on which is stored computer-executable instructions which when executed by a computer perform a method of managing personal information in a distributed computing environment, the method executed by the computer-executable instructions comprising:
generating an access code for providing access to stored personal information, the stored personal information having embedded a leak marker for tracing unauthorized transfers of the stored personal information, wherein the leak marker is associated with at least one portion of the personal information and identifiable to a personal information owner;
generating at least one access rule associated with the access code for providing access to the at least one portion of the personal information;
applying the at least one access rule to the access code for restricting access to the at least one portion of the personal information;
providing the access code to a requester of personal information;
receiving at the personal information store a request for the at least one portion of the personal information along with a requester access code, the portion comprising a first email address; and
when the requested portion of the personal information complies with the at least one applied access rule associated with the requester access code, providing the requester with a second email address, the second email address corresponding to a transfer site configured to provide a forwarding service to the requester; and
when the request for the portion of the personal information is a request for financial information for a provider of the personal information, providing an encrypted key for allowing the requester of personal information to process a transaction using the encrypted key without receiving the financial information for the provider of the personal information.

17. The computer-readable storage device of claim 16, wherein applying the at least one to the access code for restricting access by the requester of personal information to the at least one portion of the personal information comprises restricting access to the at least one portion of the personal information for an authorized number of uses.

18. The computer-readable storage device of claim 16, further comprising prior to providing the requested at least one portion of the personal information, determining whether the requester access code received at the personal information store is valid for the requested at least one portion of the personal information.

19. The computer-readable storage device of claim 16, further comprising:
receiving an updating of the at least one portion of the stored personal information; and
when a valid request is subsequently received for the at least one portion of the stored personal information that has been updated, providing the updated at least one portion of the personal information in response to the valid request.

\* \* \* \* \*